US005145148A

United States Patent [19]

Laurent

[11] Patent Number: 5,145,148

[45] Date of Patent: Sep. 8, 1992

[54] SOLENOID VALVE OPERATING MECHANISM COMPRISING A PIN HAVING A PLASTIC SLEEVE MOLDED ONTO A METAL CORE

[75] Inventor: Ray V. Laurent, Ortonville, Mich.

[73] Assignee: Siemens Automotive L.P., Auburn Hills, Mich.

[21] Appl. No.: 792,126

[22] Filed: Nov. 14, 1991

[51] Int. Cl.5 .............................................. F16K 31/06

[52] U.S. Cl. .......................... 251/129.14; 251/129.15; 251/368; 137/375

[58] Field of Search ............. 251/129.15, 368, 129.14; 335/262, 261; 137/375

[56] References Cited

U.S. PATENT DOCUMENTS

| | | | |
|---|---|---|---|
| 3,480,040 | 11/1969 | Erickson | 251/129.15 X |
| 3,670,768 | 6/1972 | Griswold | 251/129.15 X |
| 4,233,585 | 11/1980 | Sugimoto et al. | 335/262 |
| 4,509,716 | 4/1985 | Barber et al. | 251/129.15 X |
| 4,522,374 | 6/1985 | Neff | 137/375 X |
| 4,712,767 | 12/1987 | Losser et al. | 251/129.15 X |

*Primary Examiner*—Arnold Rosenthal
*Attorney, Agent, or Firm*—George L. Boller; Russel C. Wells

[57] ABSTRACT

The actuating mechanism of a normally closed solenoid valve has a push pin, or plunger, that is acted upon by the solenoid's armature to unseat a spring-biased spherical ball from a valve seat when the solenoid is operated from de-energized to energized. The pin is disposed in the flow path through the valve and executes reciprocating axial motion as the solenoid is energized and de-energized. The pin is guided by a portion of the wall describing the flow path. The pin has a slender cylindrical core that is surrounded by a plastic sleeve that has been over-molded onto the core. Because it is slender, the metal core does not interfere with the solenoid's magnetic circuit that operates the armature. The sleeve has a nominally circular O.D. that provides for the close guidance of the pin's axial reciprocation, and it contains slots that provides flow channels for the fluid passing along the pin when the valve is open.

16 Claims, 1 Drawing Sheet

14 22 34 35 32 30 80 24 26 10 28 27 82 44 38 70 66 12 54 72 50 56 42 40 46 52 16 20 48 18 48 46 36

SOLENOID VALVE OPERATING MECHANISM COMPRISING A PIN HAVING A PLASTIC SLEEVE MOLDED ONTO A METAL CORE

FIELD OF THE INVENTION

This invention relates to solenoid valves and in particular to the actuating mechanisms of such valves.

BACKGROUND AND SUMMARY OF THE INVENTION

When the solenoids of certain solenoid valves are operated from de-energized to energized, a metal pin, or plunger, that is disposed in a flow path through the valve is operated from an original position to unseat a spring-biased valve element, and thus open the flow path. When the solenoid is de-energized, the spring re-seats the valve element, thereby closing the flow path, and causing the pin to be returned to its original position.

An example of such a solenoid valve is one that is used in a hydraulic adaptive braking system of an automotive vehicle. Due to its proximity to the solenoid valve's magnetic circuit, the metal pin had to be made from non-magnetic stainless steel. To assure adequate life for the pin, it was necessary for the tip end to be hardened by iron nitriding. Since the pin was disposed in the fluid flow path, it had to provide for the fluid to flow past it, and thus required machining to provide axial flow channels to carry the fluid flow. The use of such material and such procedures contributed to the cost of the pin.

The present invention relates to a new and improved construction for such a pin. As a result, the pin of the invention can be manufactured from less costly materials using less expensive procedures. Specifically, the pin comprises a comparatively slender, generally cylindrical metal core that is surrounded by a plastic sleeve. The nature of the core allows for it to made from a material, such as 52100 steel, that can be thoroughly hardened, a less expensive and more reliable process than the limited hardening conducted on the prior pin, and such a slender core will not exert any significant detrimental influence on the magnetic circuit. The core does not require the elaborate machining procedures that characterized the prior non-magnetic stainless steel pin. The plastic sleeve is simply overmolded onto the metal core by an injection molding process. The sleeve defines axial channels that allow fluid to pass along the pin. The sleeve has a composition that is both inert to hydraulic brake fluid and will present a suitable surface characteristic to the wall of the fluid path in the valve body within which it is closely guided for axial reciprocation as the solenoid is energized and de-energized, and the axial channels that are defined by the sleeve serve to promote better flow of fluid past the pin.

Further features, advantages, and benefits of the invention, along with those already mentioned, will be seen in the ensuing description and claims which are accompanied by drawings. The drawings disclose a presently preferred embodiment of the invention according to the best mode contemplated at this time for carrying out the invention.

DESCRIPTION OF THE PREFERRED EMBODIMENT

Figure 1:
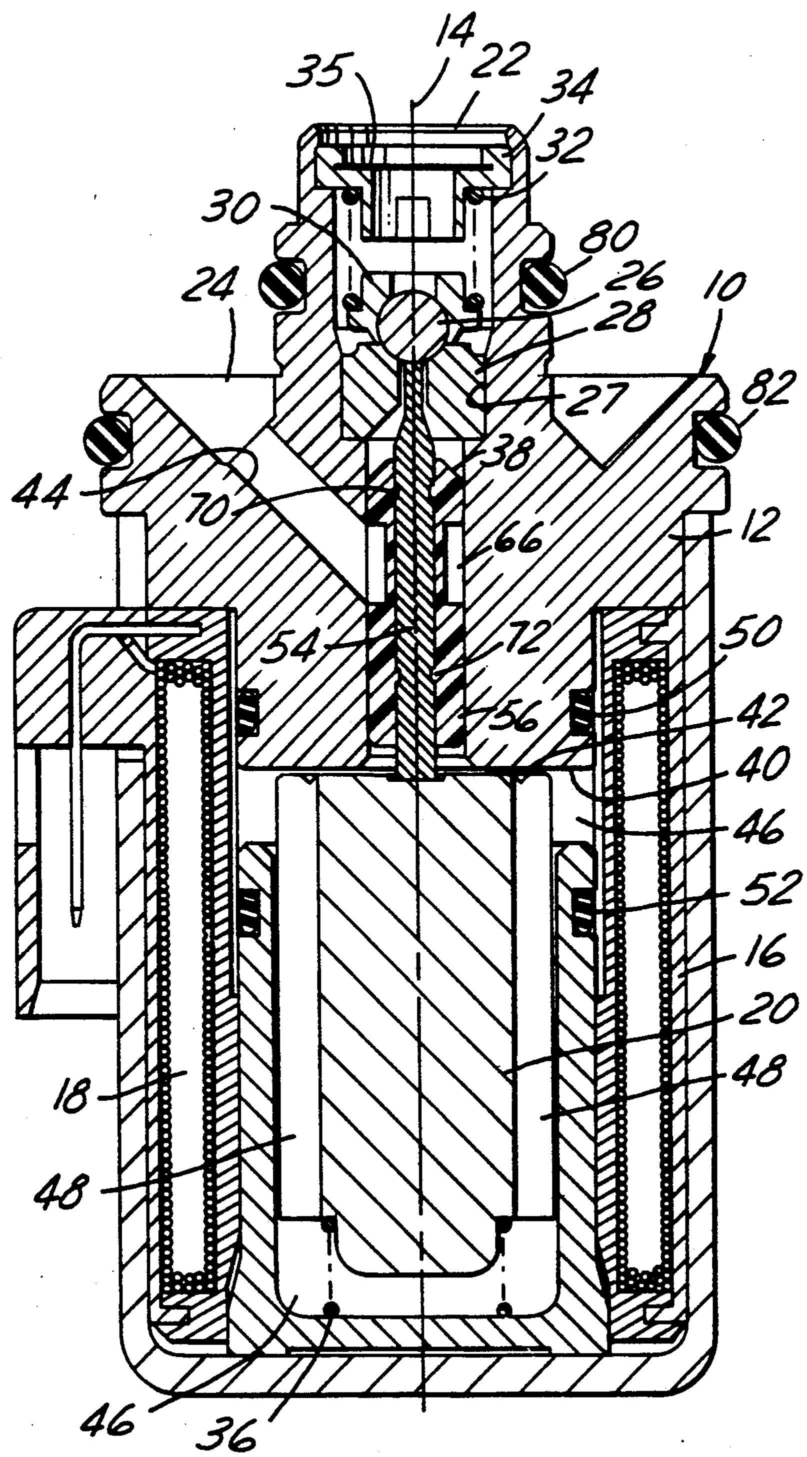
FIG. 1 is a longitudinal cross sectional view through an exemplary solenoid valve embodying principles of the invention.

FIG. 1 shows a solenoid valve 10 which comprises a body 12 having a main longitudinal axis 14. A solenoid 16 encloses the lower axial end of body 12 and comprises a coil 18 that is coaxial with axis 14 and surrounds a generally cylindrical armature 20 that is guided for axial reciprocation internally of the solenoid. Body 12 comprises an inlet port 22 that is coaxial with axis 14 and an outlet port 24 that is disposed radially outwardly of and at a lower axial elevation than inlet port 22. A spherical valve element 26 controls the flow through an internal flow path between inlet port 22 and outlet port 24.

Body 12 comprises a central multi-shouldered through-bore 27 within, and against a shoulder of, which a valve seat member 28 is disposed. Valve element 26 is retained centrally in a carrier 30 which has a spring seat receiving one end of a helical coil spring 32 whose opposite end is received in a spring seat of a filter assembly 34. Assembly 34 closes the upper end of through-bore 27 but contains a transversely disposed mesh screen element 35 for filtering any particulate material above a certain size that may happen to be entrained in the fluid that is supplied to inlet port 22. The organization and arrangement of these several parts is such that spring 32 biases valve element to seat on the frusto-conical seating surface of seat member 28 and thereby close the flow path between ports 22 and 24 to flow.

Another helical coil spring 36 is disposed between the lower axial end of armature 20 and a transverse end wall portion of solenoid 16. The spring biases the armature upwardly. A pin 38 is disposed between the upper axial end face of armature 20 and valve element 26, the upper axial end face of the armature containing a shallow central depression for receiving the lower end of the pin. The bias force that is exerted by spring 36 on armature 20 is transmitted by the armature through pin 38 to valve element 26, but it is insufficient to unseat the valve element from the seating surface of member 28. This description that has just been given, and is depicted by FIG. 1, represents the closed, or flow-blocking, position assumed when solenoid 16 is de-energized. It is to be observed that in this condition, a small axial working gap 42 exists between the upper end face of armature 20 and a juxtaposed lower axial end face 40 of body 12.

When solenoid 16 is energized, the magnetic flux issued from it appears across working gap 42, creating an axial force attracting armature 20 toward end face 40. As a result, the armature moves toward that end face with the axial dimension of working gap 42 diminishing in the process. The motion of the armature is transmitted through pin 38 to valve element 26, causing the latter to unseat from the seating surface of member 28. The solenoid valve is now open so that fluid can flow from inlet port 22 through the flow path through body 12 to outlet port 24. This flow path extends from inlet port 22, into through-bore 27, past valve element 26, through member 28, along a portion of pin 38 to a slant hole 44 in body 12, and finally through slant hole 44 to outlet port 24. As will become more apparent from ensuing description of its details, pin 38 defines, in cooperation with through-bore 27 that portion of the flow path between member 28 and the intersection of slant hole 44 with through-bore 27.

The shapes of pin 38 and armature 20 are also such that fluid is allowed to fill an interior space 46 within the solenoid surrounding the armature. Accordingly, armature 20 includes several axially extending slots 48 arranged in a uniform pattern around its O.D. O-ring seals 50 and 52 seal off interior space 46 so that fluid does not leak out. With this arrangement, the fluid surrounds the armature at all times.

When solenoid 16 is de-energized, the magnetic force acting on the armature ceases, at which time spring 32 is effective to re-seat valve element 26 on seat member 28. Simultaneously, the closing valve element, acting through pin 38, returns armature 20 to the position of FIG. 1.

Figure 2:
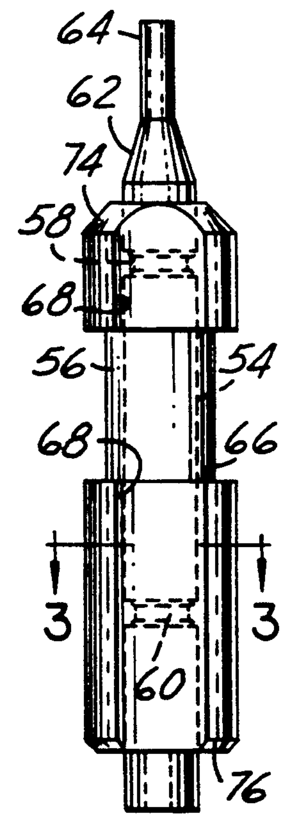
FIG. 2 is an enlarged longitudinal view of the pin, or plunger, of the solenoid valve of FIG. 1.
Figure 3:
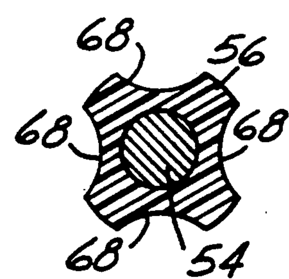
FIG. 3 is a transverse cross sectional view in the direction of arrows 3—3 in FIG. 2.

Attention is now directed to details of pin 38 with reference to FIGS. 2 and 3 as well. The pin comprises a generally cylindrical metal core 54 containing a non-metallic sleeve 56. The overall axial length of sleeve 56 is less than that of core 54 so that the core protrudes from the sleeve at opposite axial ends. Core 54 has a nominally circular O.D. that is interrupted by two axially spaced apart grooves 58 and 60 as shown. The protruding end of the core which acts on valve element 26 comprises a taper 62 that provides a transition between the nominal O.D. and a reduced diameter circular cylindrical tip end portion 64.

Sleeve 56 comprises a nominally circular O.D. that is axially interrupted by a circumferentially continuous circular slot 66. The nominally circular O.D. of the sleeve provides a close fit with the circular cylindrical wall of through-bore 27 for allowing that wall to guide the axial reciprocation of the pin as the solenoid is energized and de-energized. It also comprises four axially extending slots 68 that are straight and arranged in a uniform pattern about the pin's axis, which is co-axial with axis 14 in solenoid valve 10. Each of these slots 68 is defined by a concave surface that faces the wall of that portion of through-bore 27 within which the pin is disposed. Sleeve 56 also has two internal circumferentially continuous flanges 70 and 72 that lodge in grooves 58 and 60 respectively to form a mechanical interference that resists relative axial motion between the sleeve and core. The opposite axial ends of the sleeve also have frusto-conical leads 74 and 76.

Pin 38 is fabricated by machining core 54 to the illustrated shape and then insert- or over-molding the sleeve onto it. The sleeve is preferably a plastic. Filled nylon containing both polytetrafluoroethylene and silicone for the fill is a preferred material. This composition is resistant to certain fluids that will be carried by the solenoid valve and it provides satisfactory lubricity with that portion of the wall of through-bore 27 within which it has a close fit for guiding its reciprocation as the solenoid is energized and de-energized.

By providing axial slots 68 and circular slot 66, the pin cooperates with the wall of through-bore 27 to define channels for the fluid to efficiently flow from member 28 to slant hole 44 as it passes along pin 38 through the through-bore.

It will be observed that the metal core has a small diameter and is spaced inwardly from the working gap 42 so that it has negligible interaction with the magnetic circuit that operates the valve. Thus, it can be made of a material that can be machined and through-hardened. The sleeve can be molded onto it by conventional molding procedures that will provide proper dimensional control of the fit of the pin in the through-bore.

When solenoid valve 10 is put to use, it is assembled into a receptacle of the adaptive braking system with which external O-rings 80 and 82 seal to externally isolate the fluid supplied to inlet port 22 from that at outlet port 24.

Thus, the pin provides a meaningful improvement for a solenoid valve, and it should be appreciated that principles of the invention may be employed in other equivalent embodiments and in valves other than the one that has been specifically disclosed herein as an example.

What is claimed is:

1. A solenoid valve comprising valve body means having a fluid flow path containing a valve element that is selectively seated on and unseated from a valve seat by means of an electrically operated mechanism to control fluid flow through said flow path, aid electrically operated mechanism comprising an electromagnetic coil, armature means, bias means, and a pin that are organized and arranged to be effective in response to the selective energization and de-energization of said coil to seat and unseat said valve element on and from said seat, said pin being disposed between said armature means and said valve element in a circular cylindrical bore portion of said valve body means which comprises a first portion of said flow path, said flow path comprising a second portion that transversely intersects said bore portion such that one section of said bore portion is to one side of the intersection of said second portion of said flow path with said bore portion and another section of said bore portion is to an opposite side of the intersection of said second portion of said flow path with said bore portion, and said pin being guided by said bore portion for axial reciprocation therein in response to the selective energization and de-energization of said coil, characterized in that said pin comprises a metal core which extends between said armature means and said valve element and which is circumferentially surrounded by a non-metallic means via which both said one and said another sections of said bore portion guide the axial reciprocation of said pin, in that said non-metallic means has in transverse cross section a nominally circular outside diameter, and in that said pin comprises one or more slots which interrupt said nominally circular outside diameter of said non-metallic means and through which fluid flow through said at least a portion of said flow path passes.

2. A solenoid valve as set forth in claim 1 characterized further in that said non-metallic means comprises a cylindrical sleeve and said one or more slots comprise one or more axial slots in said sleeve.

3. A solenoid valve as set forth in claim 2 characterized in that said one or more slots further comprises a circumferentially extending circular slot intermediate opposite axial ends thereof, said second portion of said flow path intercepting said bore portion at the location of said circular slot.

4. A solenoid valve as set forth in claim 2 characterized further in that said at least one axial slot comprises plural straight axial slots arranged in a symmetrical circumferential pattern about said pin.

5. A solenoid valve as set forth in claim 4 characterized further in that there are four such axial slots that present concave surfaces toward said bore portion.

6. A solenoid valve as set forth in claim 2 characterized further in that said metal core and said sleeve comprise means that are in mechanical interference that resists relative axial movement between said metal core and said sleeve.

7. A solenoid valve as set forth in claim 6 characterized further in that said means that are in mechanical interference comprise radially outwardly open groove means in said metal core and radially inwardly projecting flange means on said sleeve disposed in said groove means.

8. A solenoid valve as set forth in claim 7 characterized further in that said groove means and said flange means are both circumferentially continuous.

9. A solenoid valve comprising valve body means having a fluid flow path containing a valve element that is selectively seated on and unseated from a valve seat by means of an electrically operated mechanism to control fluid flow through said flow path, said electrically operated mechanism comprising an electromagnetic coil, armature means, bias means, and a pin that are organized and arranged to be effective in response to the selective energization and de-energization of said coil to seat and unseat said valve element on and from said seat, said pin being disposed between said armature means and said valve element in a circular cylindrical bore portion of said valve body means which includes at least a portion of said flow path, and said pin being guided by said bore portion for axial reciprocation therein in response to the selective energization and de-energization of said coil, characterized in that said pin comprises a metal core which extends between said armature means and said valve element and which is circumferentially surrounded by a non-metallic means via which said bore portion guides the axial reciprocation of said pin, in that said non-metallic means has in transverse cross section a nominally circular outside diameter, in that said pin comprises one or more slots which interrupt said nominally circular outside diameter of said non-metallic means and through which fluid flow through said at least a portion of said flow path passes, in that said non-metallic means comprises a cylindrical sleeve and said one or more slots comprise one or more axial slots in said sleeve, and characterized further in that said sleeve comprises a composition of filled nylon where the fill includes polytetrafluoroethylene and silicone.

10. A pin for the actuating mechanism of a solenoid valve characterized in that said pin comprises a metal core which is circumferentially surrounded by a non-metallic means via which said pin is guided for axial reciprocation in such a solenoid valve, in that said non-metallic means has in transverse cross section a nominally circular outside diameter, in that said pin comprises one or more slots which interrupt said nominally circular outside diameter of said non-metallic means, in that said non-metallic means comprises a cylindrical sleeve and said one or more slots comprise one or more axial slots in said sleeve, and characterized further in that said metal core and said sleeve comprise groove and flange means that are in mechanical interference that resists relative axial movement between said metal core and said sleeve.

11. A pin as set forth in claim 10 characterized in that said one or more slots further comprises a circumferentially extending circular slot intermediate opposite axial ends thereof.

12. A pin as set forth in claim 10 characterized further in that said at least one axial slot comprises plural straight axial slots arranged in a symmetrical circumferential pattern about said pin.

13. A pin as set forth in claim 12 characterized further in that there are four such axial slots that present radially outwardly facing concave surfaces.

14. A pin as set forth in claim 10 characterized further in that said means that are in mechanical interference comprise radially outwardly open groove means in said metal core and radially inwardly projecting flange means on said sleeve disposed in said groove means.

15. A pin as set forth in claim 14 characterized further in that said groove means and said flange means are both circumferentially continuous.

16. A pin for the actuating mechanism of a solenoid valve characterized in that said pin comprises a metal core which is circumferentially surrounded by a non-metallic means via which said pin is guided for axial reciprocation in such a solenoid valve, in that said non-metallic means has in transverse cross section a nominally circular outside diameter, in that said pin comprises one or more slots which interrupt said nominally circular outside diameter of said non-metallic means, said non-metallic means comprises a cylindrical sleeve and said one or more slots comprise one or more axial slots in said sleeve, and characterized further in that said sleeve comprises a composition of filled nylon where the fill includes polytetrafluoroethylene and silicon.

* * * * *